United States Patent
Meng et al.

(10) Patent No.: US 11,995,814 B2
(45) Date of Patent: May 28, 2024

(54) DETECTION METHOD AND APPARATUS, ELECTRONIC DEVICE, AND STORAGE MEDIUM

(71) Applicants: Semiconductor Manufacturing International (Shanghai) Corporation, Shanghai (CN); Semiconductor Manufacturing International (Beijing) Corporation, Beijing (CN)

(72) Inventors: Yang Meng, Shanghai (CN); Weibin Wang, Shanghai (CN)

(73) Assignees: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

( * ) Notice: Subject to any disclaimer, the term of this patent is extended or adjusted under 35 U.S.C. 154(b) by 440 days.

(21) Appl. No.: 17/155,501

(22) Filed: Jan. 22, 2021

(65) Prior Publication Data
US 2022/0028046 A1 Jan. 27, 2022

(30) Foreign Application Priority Data
Jul. 24, 2020 (CN) .......................... 202010727714.8

(51) Int. Cl.
*G06T 7/00* (2017.01)

(52) U.S. Cl.
CPC ................ *G06T 7/001* (2013.01); *G06T 7/97* (2017.01); *G06T 2207/10061* (2013.01);
(Continued)

(58) Field of Classification Search
CPC . G06T 7/001; G06T 7/97; G06T 2207/10061; G06T 2207/20081;
(Continued)

(56) References Cited

U.S. PATENT DOCUMENTS

2015/0136976 A1* 5/2015 Matsuoka .......... G01N 23/2251
250/306
2017/0206650 A1* 7/2017 Kulkarni ................. G06T 7/001
(Continued)

OTHER PUBLICATIONS

Weibo Huang et al., "A PCB Dataset for Defects Detection and Classification", Journal of Latex Class Files, vol. 14, No. 8, Aug. 2018.*

*Primary Examiner* — Samir A Ahmed
(74) *Attorney, Agent, or Firm* — Crowell & Moring LLP

(57) ABSTRACT

Embodiments of the present disclosure provide a detection method and apparatus, an electronic device, and a storage medium. In one form, the detection method includes: providing a layout graphic and a scan graphic; superimposing and comparing the layout graphic and the scan graphic, and extracting a sample non-overlapping pattern; encoding the sample non-overlapping pattern, to form sample coded data; using the sample coded data as input data of machine learning, to obtain a detection model library; and detecting a defect point of a to-be-detected device by using the detection model library. The present disclosure can improve the accuracy of defect point analysis, thereby accelerating the development of technology and improving the production efficiency.

14 Claims, 5 Drawing Sheets

(52) U.S. Cl.
CPC ............... *G06T 2207/20081* (2013.01); *G06T 2207/20084* (2013.01); *G06T 2207/30148* (2013.01)

(58) Field of Classification Search
CPC . G06T 2207/20084; G06T 2207/30148; G06T 7/0006; G06T 2207/10004; G06N 3/08; G06N 3/045

See application file for complete search history.

(56) References Cited

U.S. PATENT DOCUMENTS

| | | | |
|---|---|---|---|
| 2020/0174380 A1* | 6/2020 | Huang | ................ G03F 7/70441 |
| 2021/0232745 A1* | 7/2021 | Chou | .................... G06N 20/00 |

* cited by examiner

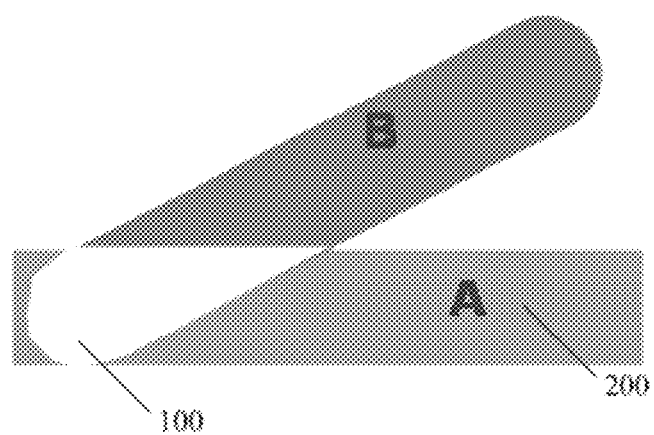
FIG. 6
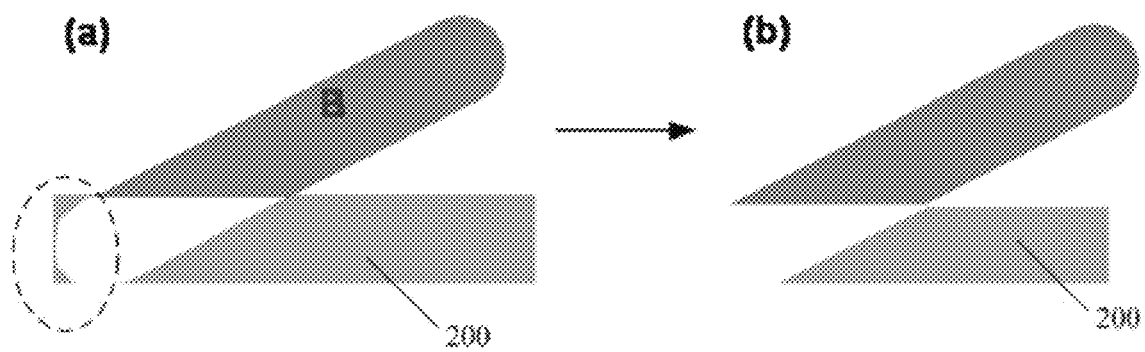
FIG. 7a
FIG. 7b
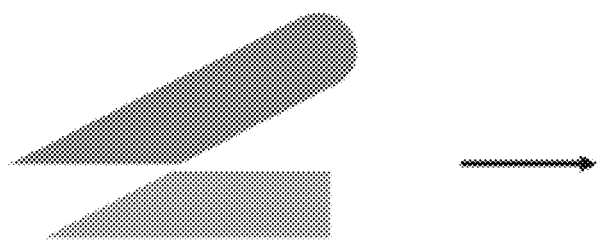
Fig. 8a
Fig. 8b

DETECTION METHOD AND APPARATUS, ELECTRONIC DEVICE, AND STORAGE MEDIUM

RELATED APPLICATIONS

The present application claims priority to Chinese Patent Appln. No. 202010727714.8, filed Jul. 24, 2020, the entire disclosure of which is hereby incorporated by reference.

BACKGROUND

Technical Field

The present disclosure relates to the field of semiconductor manufacturing, and in particular, to a detection method and apparatus, an electronic device, and a storage medium.

Related Art

In recent years, with the continuous progress of semiconductor manufacturing technologies, a minimum feature size of semiconductors has decreased, and a graphic density of semiconductors has further increased. More recently, semiconductor chip factories have a greater ability to more easily find additional defects in an early stage of developing a next-generation technology.

In existing methods, some modes that allow a computer to automatically find defects are used. For example, only very limited differences between a wafer image and its layout design can be found. The wafer image and the layout design cannot be fully analyzed. Therefore, a result is usually not ideal. Many defect points are caused by random defects or defective processes, and some real defect points are also omitted.

Therefore, a fast and accurate method is needed urgently to discover and analyze such defect points, to accelerate the development of process technology and increase production.

SUMMARY

Embodiments and implementations of the present disclosure provide a detection method and apparatus, an electronic device, and a storage medium, and can improve detection accuracy of a defect point of a to-be-detected device.

To address the above problem, one form of the present disclosure provides a detection method, including: providing a layout graphic and a scan graphic; superimposing and comparing the layout graphic and the scan graphic, and extracting a sample non-overlapping pattern; encoding the sample non-overlapping pattern, to form sample coded data; using the sample coded data as input data of a machine learning algorithm, to obtain a detection model library; and detecting a defect point of a to-be-detected device by using the detection model library.

In some implementations, the machine learning algorithm includes a convolutional neural network learning method.

In some implementations, the layout graphic is a layout graphic of a sample device, and the scan graphic is a scan graphic of the sample device, to establish an initial detection model library.

In some implementations, the layout graphic is a layout graphic of the to-be-detected device, and the scan graphic is a scan graphic of the to-be-detected device, to update the detection model library.

In some implementations, a method for obtaining the scan graphic of the sample device or obtaining the scan graphic of the to-be-detected device includes: scanning by using an electron microscope.

In some implementations, superimposing and comparing the layout graphic and the scan graphic, and extracting a sample non-overlapping pattern includes: superimposing the layout graphic and the scan graphic, and performing an exclusive-or operation on the superimposed graphics.

In some implementations, superimposing and comparing the layout graphic and the scan graphic, and extracting a sample non-overlapping pattern further includes: performing interference elimination processing on the sample non-overlapping pattern through a graphic extraction rule.

In some implementations, the graphic extraction rule is: setting a processing range of a long side to 9% to 11% of a design feature size, and setting a processing range of a short side to 35 nm to 45 nm.

In some implementations, the sample coded data is a multidimensional data matrix.

In some implementations, the sample coded data is a two-dimensional data matrix, and the sample coded data is in a format of m*n*t, where m*n represents a size of the matrix, and t represents a quantity of channels.

In some implementations, the sample non-overlapping pattern is a grayscale pattern, and t is 1. In some implementations, the to-be-detected device is a mask or a patterned wafer.

Another form of the present disclosure further provides a detection apparatus, including: an obtaining module configured to obtain a layout graphic and a scan graphic; an extraction module configured to superimpose and compare the layout graphic and the scan graphic, and to extract a sample non-overlapping pattern; an encoding module configured to encode the sample non-overlapping pattern to form a sample coded data machine learning module configured to use the sample coded data as input data of machine learning, to obtain a detection model library; and a detection module configured to detect a defect point of a to-be-detected device by using the detection model library.

In some implementations, the machine learning module is a module for machine learning based on a convolutional neural network. In some implementations, the to-be-detected device is a mask or a patterned wafer.

Further forms of the present disclosure provide an electronic device, including a memory, a processor, and a computer program stored in the memory that is capable of being run on the processor, where the processor, when executing the program, implements steps of the detection method according to the embodiments and implementations of the present disclosure.

Yet further implementations of the present disclosure provide a computer-readable storage medium, storing one or more computer instructions, the one or more computer instructions being used to implement the detection method according to the embodiments of the present disclosure.

According to technical solutions provided in the present disclosure, a detection model is established and trained by using a machine learning algorithm, and a detection model library is formed; a defect point of a to-be-detected semiconductor device is detected using the detection model library, where a layout graphic and a scan graphic of the semiconductor device are superimposed and compared, to extract a sample non-overlapping pattern; and the sample non-overlapping pattern is encoded to form sample coded data, and the sample coded data is used as input data of the machine learning algorithm, thereby establishing and training the detection model. In a process of superimposing and comparing, non-overlapping patterns can be extracted, and then training and detection are performed by using machine learning. Therefore, defect points of a semiconductor device can be collected fully and rapidly, avoiding omission of defect points, thereby improving detection accuracy of the defect points of the semiconductor device.

BRIEF DESCRIPTION OF THE DRAWINGS

FIG. 6 illustrates an extraction mode of a non-overlapping pattern of an unmatched pattern in FIGS. 5a and 5b;

FIGS. 7a and 7b are graphics formed from FIG. 6 by eliminating interference according to a rule;

FIGS. 8a and 8b are schematic diagrams of transforming the graphic in FIGS. 7a and 7b into a grayscale matrix;

DETAILED DESCRIPTION

It will be appreciated from the background that semiconductor detection methods in the existing technology cannot comprehensively analyze a semiconductor device. As a result, conventional semiconductor detection methods are not ideal. Many defect points are caused by random defects or defective processes, and some real defect points are also omitted. Causes of the problem are analyzed with reference to the existing semiconductor detection methods.

Figure 1A:
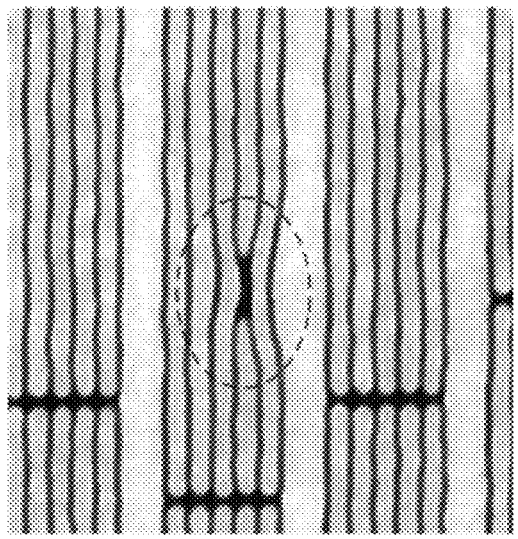
FIGS. 1a and 1b are schematic diagrams of defect point types of a semiconductor device.
Figure 1B:
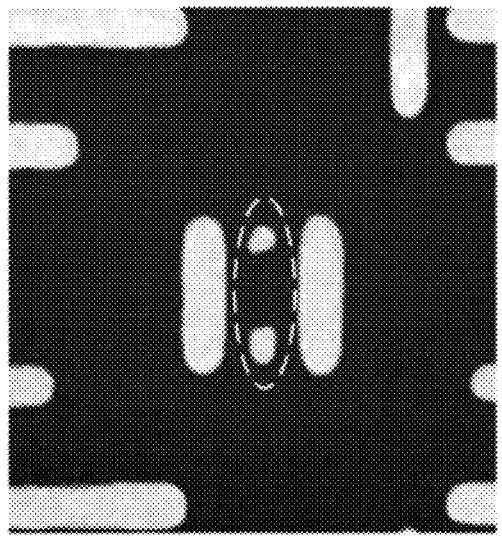

FIGS. 1a and 1b show defect point types of a semiconductor device. A typical breaking and pinch of a semiconductor device are shown in the dotted boxes. In conventional detection methods, to determine whether a defect point is included in a device, a layout image corresponding to the device needs to be provided first, and an electron microscope is used to scan the device to obtain a scan image. Then, the layout image and the scan image are aligned, and a size in the scan image is measured by using a feature size in the layout image as a measurement reference. If a measured size is 0, a defect point is found. However, such a method is generally only suitable for the case shown in FIG. 1b, where a length of a defect breaking in FIG. 1b is wide. In a process of measurement, a computer usually selects two directions, which are parallel to a long side of a rectangle and perpendicular to a short side of the rectangle, and then conducts measurement in two positions of each direction. With the two positions, it can be generally obtained that a measurement size of the breaking line position in FIG. 1b is 0. However, in some other cases, some defect points may be omitted.

Figure 2:
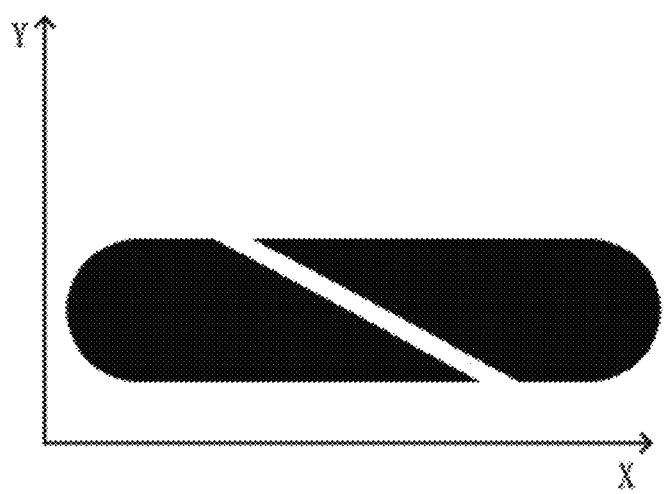
FIG. 2 is a schematic diagram of another type of defect point of a semiconductor device.

For example, FIG. 2 is a schematic diagram of another type of defect point. When a size of the defect point in FIG. 2 is measured, it is easy to occur that a measurement size is not 0. Specifically, in the existing technology, a size of a layout graphic corresponding to the module in the figure is used as a measurement reference first. Next, sizes of two positions are measured by passing through the graphic along a direction parallel to the X direction, and then sizes of two positions are measured by passing through the graphic along a direction parallel to the Y direction. None of the sizes of the positions is 0. However, there is an obvious breaking in the module, and the breaking should be detected as a defect point. However, the existing technology cannot find such a defect point, which affects the detection accuracy and the detection efficiency.

To address the above problem, the present disclosure provides a detection method and apparatus. In technical solutions, a detection model is established and trained using a machine learning algorithm, and a detection model library is formed; a defect point of a to-be-detected semiconductor device is detected using the detection model library; a layout graphic and a scan graphic of the semiconductor device are superimposed and compared, to extract a sample non-overlapping pattern; and the sample non-overlapping pattern is encoded to form sample coded data, and the sample coded data is used as input data of the machine learning algorithm, thereby establishing and training the detection model. In a process of superimposing and comparing, all non-overlapping patterns can be extracted, and then training and detection are performed using machine learning. Therefore, defect points of a semiconductor device can be collected fully and rapidly, avoiding omission of defect points, thereby accelerating the development of technology and improving the production efficiency.

To make the above objects, features and advantages of the present disclosure easier to understood, specific embodiments and implementations of the present disclosure will be explained in detail below with reference to the accompanying drawings.

Figure 3:
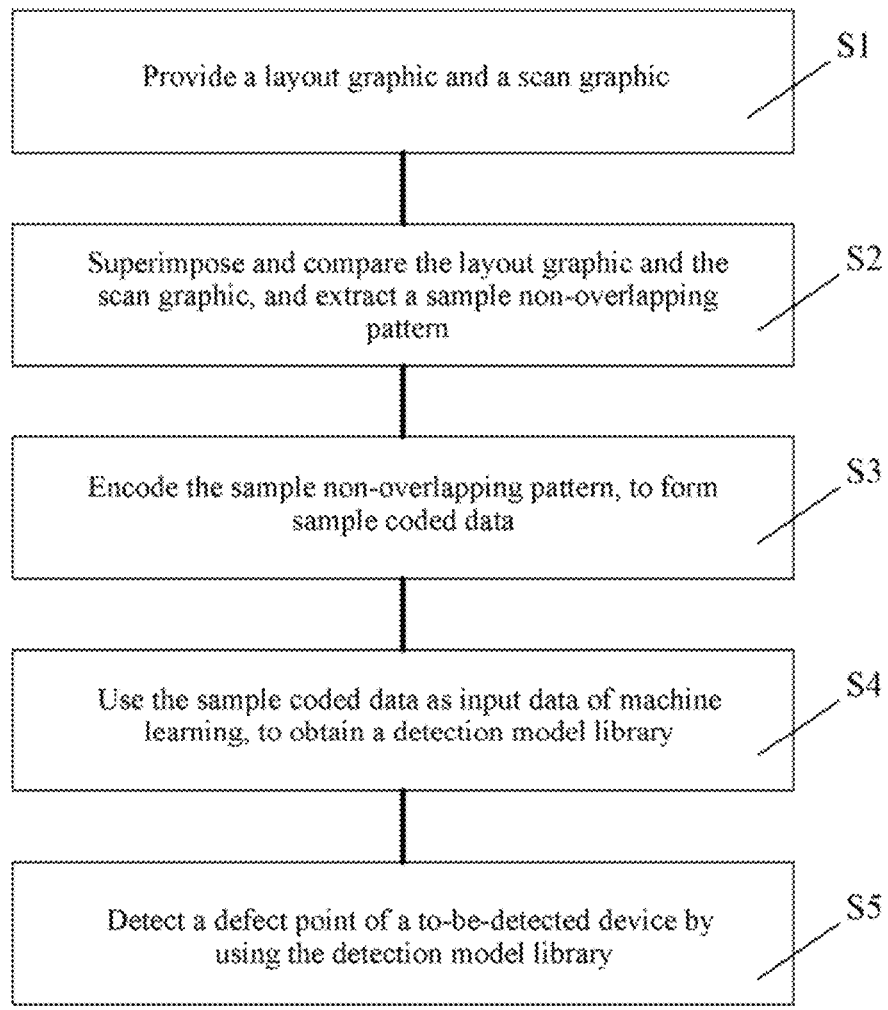
FIG. 3 is a schematic diagram of one form of a detection method.

FIG. 3 is a schematic flowchart of one form of a detection method. The form of the detection method includes the following steps:

Step S1: Provide a layout graphic and a scan graphic.

Step S2: Superimpose and compare the layout graphic and the scan graphic, and extract a sample non-overlapping pattern.

Step S3: Encode the sample non-overlapping pattern, to form sample coded data.

Step S4: Use the sample coded data as input data of a machine learning algorithm, to obtain a detection model library;

Step S5: Detect a defect point of a to-be-detected device by using detection model library.

Implementations of a training method and a detection method according to the present disclosure are explained in detail with the accompanying drawings below. In some implementations, the sample device is a mask. In other implementations, the sample device may alternatively be a patterned wafer.

Figure 4A:
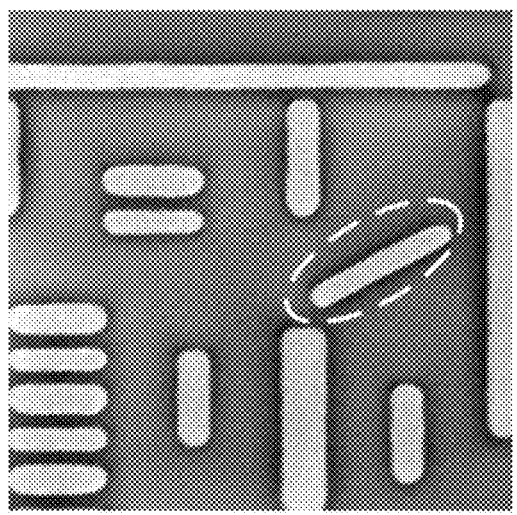
FIGS. 4a and 4b are comparison diagrams of a scan graphic and a layout graphic of a device in FIG. 3.
Figure 4B:
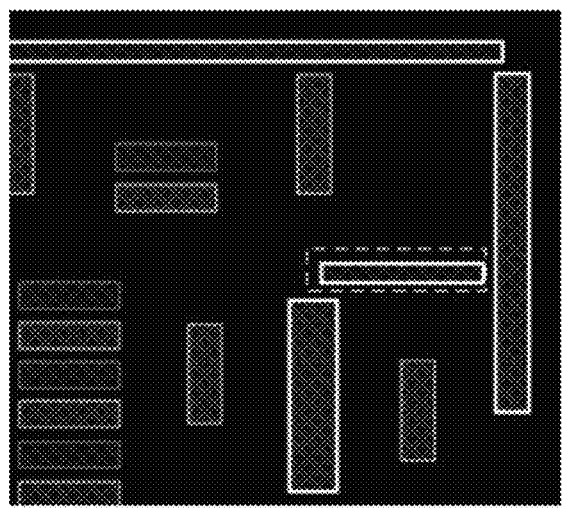

Step S1 is performed to provide a layout graphic and a scan graphic. FIG. 4a and FIG. 4b show a comparison diagram of a scan graphic and a layout graphic of a device. The device shown in the figure is used as a sample device below, to explain a process of establishing a detection model by using a machine learning algorithm and forming a detection model library in step S1.

FIG. 4a shows the scan graphic of the sample device. In some implementations, the scan graphic is obtained scanning the sample device with an electron microscope. The right side of FIG. 4b shows the layout graphic of the sample device.

During measurement of a feature size of the sample device, the layout graphic of the sample device can give a reference boundary for measurement. Therefore, the layout graphic of the sample device in FIG. 4a and the scan graphic of the sample device in FIG. 4b are superimposed and compared, and a sample non-overlapping pattern is extracted. It can be learned through comparison that a pattern in the circular dotted box in FIG. 4a and a pattern in the square dotted box on the right side of FIG. 4b cannot coincide.

Referring to FIG. 5 to FIG. 7b, step S2 is performed, to superimpose and compare the layout graphic and the scan graphic, and to extract a sample non-overlapping pattern.

Figure 5A:
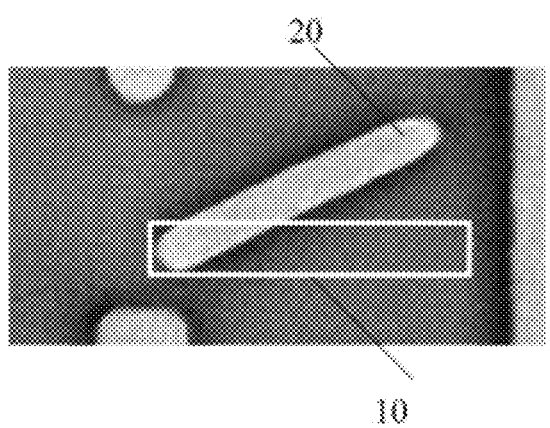
FIGS. 5a and 5b are schematic diagrams of extraction of an unmatched pattern in FIG. 4.
Figure 5B:
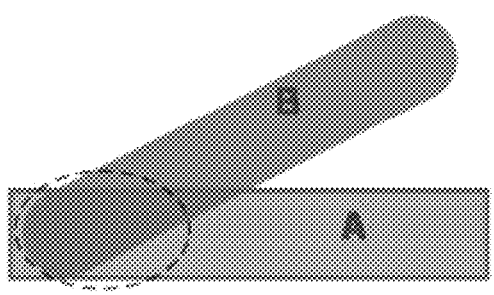

As shown in FIG. 5a and FIG. 5b, the layout graphic and the scan graphic are superimposed. Specifically, FIG. 5a shows that a layout graphic 10 is disposed in a position corresponding to a scan graphic 20 of a sample device, thereby realizing superimposing of the layout graphic and the scan graphic.

FIG. 5b is a schematic diagram of extraction of a graphic obtained through feature extraction on FIG. 5a, to obtain superimposed graphics. Specifically, feature parts of the layout graphic 10 and the scan graphic 20 are extracted through graphic processing, where a graphic A corresponds to the layout graphic, and a graphic B corresponds to the scan graphic of the sample device. The feature parts refer to feature information such as a layout graphic position, grayscale, and an edge. As shown in FIG. 5b, in some implementations, the graphic A and the graphic B have an overlapping area (an area indicated by the oval dotted box), and a non-overlapping area.

FIG. 6 shows an extraction mode of the non-overlapping pattern in FIG. 5b. As shown in the figure, specifically, an XOR operation (exclusive-or operation) is performed on the superimposed graphics (including the graphic A and the graphic B), to offset the overlapping area of the graphic A and the graphic B, thereby forming a blank area 100 in FIG. 6. A remaining graphic that is not offset is a non-overlapping pattern 200, such as the remaining graphic with grayscale in FIG. 6.

In some implementations, an area of an overlapping pattern in the superimposed graphics is removed through an exclusive-or operation. In other implementations, other methods may be used to remove the overlapped graphic part.

FIGS. 7a and 7b are graphics obtained by performing interference elimination processing on FIG. 6. FIG. 7a is a graphic before performing interference elimination processing on FIG. 6, and FIG. 7b is a graphic after performing interference elimination processing on FIG. 6.

It should be noted that in a process of mask or semiconductor wafer manufacturing, an actual device graphic cannot be completely consistent with a layout graphic designed by a computer. Therefore, some unimportant areas (for example, as shown in the dotted box in FIG. 7(a)) of the non-overlapping pattern 200 may be omitted through the interference elimination processing, to eliminate interference. In other implementations, the interference elimination processing may not be provided according to technology requirements (for example, in a case where impact of interference does not need to be considered), to simplify a process of graphic learning.

Specifically, in some implementations, in a process of extracting the sample non-overlapping pattern, the extraction rule further includes: performing interference elimination processing on the sample non-overlapping pattern through a graphic extraction rule, thereby eliminating interference of an edge, a corner, or a line-end in an unimportant area.

It should be noted that different graphic extraction rules may be set according to different technical nodes and different layers.

In some implementations, the graphic extraction rule is: setting a processing range of a long side to 9% to 11% (for example, 10%) of a design feature size, and setting a processing range of a short side to 35 nm to 45 nm (for example, 40 nm).

As shown in FIG. 7b, an interference part at the lower left corner of the image can be removed by shrinking the short side inward by 40 nm and the long side by 10%.

Through the interference elimination processing, an important feature part in the sample non-overlapping pattern can be highlighted, which facilitates subsequent machine learning.

Then, the sample non-overlapping pattern is encoded to form sample coded data, and the sample coded data is used as input data of the machine learning algorithm, to establish and train the detection model.

In some implementations, the machine learning algorithm is a convolutional neural network (CNN) learning method. The CNN includes an input layer, at least one hidden layer, and an output layer. The CNN has advantages of sparse interaction, parameter sharing, and multi-kernel in the field of image recognition. A CNN model can, by merely perceiving the local, synthesize local information to obtain global information in a higher layer, and parameter sharing can greatly reduce the amount of computation. Therefore, the CNN model is similar to a working mode of a human visual system, and such a mode greatly reduces a quantity of to-be-trained parameters of a neural network and improves the accuracy. Further, powerful high-dimensional nonlinear regression capability of the CNN can be used to classify defect points, to determine whether the defect points are real defect points.

It should be noted that, to match with a format of data received by CNN, encoding is needed to form the sample coded data. A format of input data of the CNN model is generally a matrix. Correspondingly, in some implementations, the sample coded data is a multidimensional data matrix.

In some implementations, the sample coded data is a two-dimensional data matrix, and the sample coded data is in a format of m*n*t, where m*n represents a size of the matrix, t represents a quantity of channels, and values of m, n and t are set according to different technical nodes and different layers.

In some implementations, because the sample non-overlapping pattern is a grayscale pattern (non-colored pattern) and has only one channel, t is 1.

FIGS. 8a and 8b are schematic diagrams of transforming a graphic in some implementations of the present disclosure into a grayscale matrix. As shown in the figure, the non-overlapping pattern 200 is merely a grayscale digital image, and therefore includes only one channel. The two-dimensional matrices with standard dimensions serve as input data of machine learning. The value in each cell of the matrix represents the grayscale of the pixel (from 0 to 255), and the standard size of the matrix is 256 by 256.

The two-dimensional matrix is used as an input model of the CNN, and defect points in FIG. 4a can be learned through the CNN. Only one type of defect point is illustrated herein. In a practical application, various types of defect points appearing in the process can be learned one by one, thereby establishing a model. After the establishment and training of the model, defect points can be detected by the model, and a detection result can be output. The detection result is divided into two categories: real defect points and non-defect points.

It should be noted that the layout graphic is a layout graphic of a sample device, and the scan graphic is a scan graphic of the sample device. Through the detection method of some implementations of the present disclosure, an initial detection model library can be established, to facilitate subsequent detection on a to-be-detected device.

In a subsequent process, the layout graphic may further be a layout graphic of the to-be-detected device, and the scan graphic is a scan graphic of the to-be-detected device. In other words, if a graphic that has never appeared in the machine learning appears in the to-be-detected device, learning may be performed again to update the detection model library. In other words, the detection results of the to-be-detected device are directly inputted as training data of the machine learning, to continuously increase the quantity of training models of the machine learning, and increasingly improve the detection accuracy.

It should be noted that in the technical solution of the present disclosure, the graphic extraction rule and the parameter setting of the CNN change with different technical nodes and different layers in the technological process, to adapt to requirements of different technical nodes and technological processes.

Based on the detection method in the above implementations, the present disclosure further provides a detection apparatus. The apparatus is used for performing the detection method in the above embodiment.

Figure 9:
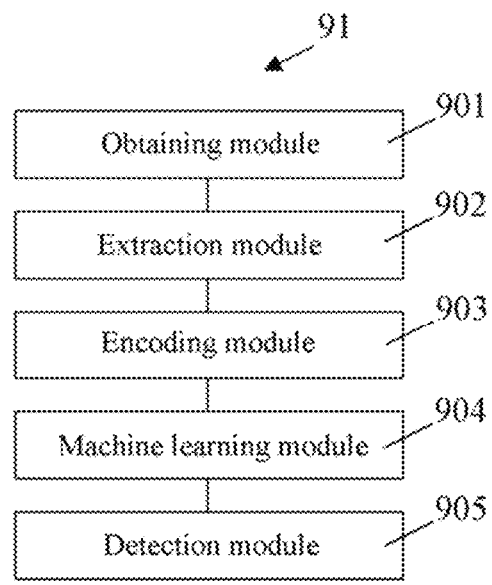
FIG. 9 is a schematic diagram of one form of a detection apparatus.

FIG. 9 is a schematic diagram of one form of a detection apparatus of the present disclosure. A detection apparatus 91 of some implementations includes:

an obtaining module 901, configured to obtain a layout graphic and a scan graphic;

an extraction module 902, configured to superimpose and compare the layout graphic and the scan graphic, and extract a sample non-overlapping pattern;

an encoding module 903, configured to encode the sample non-overlapping pattern to form a sample coded data machine learning module 904 configured to use the sample coded data as input data of machine learning, to obtain a detection model library; and a detection module 905, configured to detect a defect point of a to-be-detected device by using the detection model library.

Functions of each module are explained with reference to FIG. 4 to FIG. 8 below. In some implementations of the present disclosure, the sample device is a mask. In other implementations of the present disclosure, the sample device may alternatively be a patterned wafer.

FIG. 4a and FIG. 4b show a comparison diagram of a scan graphic and a layout graphic of one form of a device.

FIG. 4a shows the scan graphic of the sample device. The obtaining module 901 includes an electron microscope, and the scan graphic is obtained by scanning the sample device with the electron microscope. The right side of FIG. 4b is the layout graphic of the sample device, and the obtaining module 901 can obtain a corresponding layout graphic from a design graphic.

During measurement of a feature size of the sample device, the layout graphic of the sample device can give a reference boundary for measurement. Therefore, the layout graphic of the sample device in FIG. 4a and the scan graphic of the sample device in FIG. 4b are superimposed and compared, and a sample non-overlapping pattern is extracted. It can be learned through comparison that a pattern in the circular dotted box in FIG. 4a and a pattern in the square dotted box on the right side of FIG. 4b cannot coincide.

Referring to FIG. 5a to FIG. 7b, the extraction module 902 is configured to superimpose and compare the layout graphic and the scan graphic, and extract a sample non-overlapping pattern.

As shown in FIG. 5a and FIG. 5b, the extraction module 902 is configured to superimpose the layout graphic and the scan graphic.

Specifically, FIG. 5a shows that a layout graphic 10 is disposed in a position corresponding to a scan graphic 20 of a sample device, thereby realizing superimposing of the layout graphic and the scan graphic.

FIG. 5b is a schematic diagram of extraction of a graphic obtained through feature extraction on FIG. 5a, to obtain superimposed graphics. Specifically, feature parts of the layout graphic 10 and the scan graphic 20 are extracted through graphic processing, where a graphic A corresponds to the layout graphic, and a graphic B corresponds to the scan graphic of the sample device. The feature parts refer to feature information such as a layout graphic position, grayscale, and an edge. As shown in FIG. 5b, in some implementations, the graphic A and the graphic B have an overlapping area (an area indicated by the oval dotted box), and a non-overlapping area.

FIG. 6 shows an extraction mode of the non-overlapping pattern in FIG. 5b. As shown in the figure, specifically, the extraction module 902 performs an XOR operation (exclusive-or operation) on the superimposed graphics (including the graphic A and the graphic B), to offset the overlapping area of the graphic A and the graphic B, thereby forming a blank area 100 in FIG. 6. A remaining graphic that is not offset is a non-overlapping pattern 200, such as the remaining graphic with grayscale in FIG. 6.

In some implementations, the extraction module 902 removes an area of an overlapping pattern in the superimposed graphics through an exclusive-or operation. In other implementations, other methods may be used to remove the overlapped graphic part.

FIGS. 7a and 7b are graphics obtained by the extraction module 902 performing interference elimination processing on FIG. 6. FIG. 7(a) is a graphic before performing interference elimination processing on FIG. 6, and FIG. 7(b) is a graphic after performing interference elimination processing on FIG. 6.

It should be noted that in a process of mask or semiconductor wafer manufacturing, an actual device graphic cannot be completely consistent with a layout graphic designed by a computer. Therefore, the extraction module 902 may omit some unimportant areas (for example, as shown in the dotted box in (a)) of the non-overlapping pattern 200 through the interference elimination processing, to eliminate interference. In other implementations, the interference elimination processing may not be provided according to technology requirements (for example, in a case where impact of interference does not need to be considered), to simplify a process of graphic learning.

Specifically, in some implementations of the present disclosure, in a process of extracting the sample non-overlapping pattern by the extraction module 902, the extraction rule further includes: performing interference elimination processing on the sample non-overlapping pattern through a graphic extraction rule, thereby eliminating interference of an edge, a corner, or a line-end in an unimportant area.

It should be noted that different graphic extraction rules may be set according to different technical nodes and different layers.

In some implementations, the graphic extraction rule is: setting a processing range of a long side to 9% to 11% (for example, 10%) of a design feature size, and setting a processing range of a short side to 35 nm to 45 nm (for example, 40 nm).

As shown in FIG. 7b, an interference part at the lower left corner of the image can be removed by shrinking the short side inward by 40 nm and the long side by 10%.

Through the interference elimination processing, the extraction module 902 can highlight an important feature part in the sample non-overlapping pattern, which facilitates subsequent machine learning.

The encoding module 903 is configured to encode the sample non-overlapping pattern, to form sample coded data. Specifically, to be used as the input data of the machine learning module, the sample non-overlapping pattern needs to be encoded to form sample coded data, and the sample coded data is used as a form of input data acceptable to the machine learning algorithm, to establish and train a detection model.

In some implementations of the present disclosure, the machine learning module 904 is a module that performs machine learning based on the CNN. The CNN includes an input layer, at least one hidden layer, and an output layer. The CNN has advantages of sparse interaction, parameter sharing, and multi-kernel in the field of image recognition. A CNN model can, by merely perceiving the local, synthesize local information to obtain global information in a higher layer, and parameter sharing can greatly reduce the amount of computation. Therefore, the CNN model is similar to a working mode of a human visual system, and such a mode greatly reduces a quantity of to-be-trained parameters of a neural network and improves the accuracy. Further, powerful high-dimensional nonlinear regression capability of the CNN can be used to classify defect points, to determine whether the defect points are real defect points.

It should be noted that, to match with a format of data received by CNN, encoding is needed to form the sample coded data. A format of input data of the CNN model is generally a matrix. Correspondingly, in some implementations of the present disclosure, the sample coded data is a multidimensional data matrix.

In some implementations, the sample coded data is a two-dimensional data matrix, and the sample coded data is in a format of m*n*t, where m*n represents a size of the matrix, t represents a quantity of channels, and values of m, n and t are set according to different technical nodes and different layers.

In some implementations, because the sample non-overlapping pattern is a grayscale pattern (non-colored pattern) and has only one channel, t is 1.

FIGS. 8a and 8b are schematic diagrams of transforming a graphic into a grayscale matrix. As shown in the figure, the non-overlapping pattern 200 is merely a grayscale digital image, and therefore includes only one channel. The encoding module 903 may perform encoding so that the two-dimensional matrices with standard dimensions serve as input data of machine learning. The value in each cell of the matrix represents the grayscale of the pixel (from 0 to 255), and the standard size of the matrix is 256 by 256.

The two-dimensional matrix is used as an input model of the CNN, and defect points in FIG. 4a can be learned through the CNN. Only one type of defect point is illustrated herein. In a practical application, various types of defect points appearing in the process can be learned one by one, thereby establishing a model.

After the model establishment and training are completed, the detection module 905 is configured to detect a defect point of a to-be-detected device, and to output a detection result. The detection result is divided into two categories: real defect points and non-defect points.

It should be noted that the layout graphic is a layout graphic of a sample device, and the scan graphic is a scan graphic of the sample device. Through the detection apparatus of some implementations of the present disclosure, an initial detection model library can be established, to facilitate subsequent detection on a to-be-detected device.

In a subsequent process, the layout graphic may alternatively be a layout graphic of the to-be-detected device, and the scan graphic is a scan graphic of the to-be-detected device. In other words, if a graph that has never appeared in the machine learning appears in the to-be-detected device, learning may be performed again to update the detection model library. In other words, the detection results of the to-be-detected device are directly inputted as training data of the machine learning, to continuously increase the quantity of training models of the machine learning, and increasingly improve the detection accuracy.

It should be noted that in the detection apparatus of the present disclosure, the graphic extraction rule and the parameter setting of the CNN change with different technical nodes and the different layers in the technological process, to adapt to requirements of different technical nodes and technological processes.

The to-be-detected device is a patterned wafer or a mask wafer.

The implementations of the present disclosure can be implemented by various means such as hardware, firmware, software, or a combination thereof. In a hardware configuration mode, the method according to the exemplary embodiments and implementations of the present disclosure may be implemented by one or more application-specific integrated circuits (ASICs), digital signal processors (DSPs), digital signal processing devices (DSPDs), programmable logic devices (PLD), field programmable gate arrays (FPGAs), processors, controllers, microcontrollers, microprocessors, and the like.

In a firmware or software configuration mode, the implementations of the present disclosure may be implemented in the form of modules, processes, functions, and the like. Software code may be stored in a memory unit and executed by a processor. The memory unit is located inside or outside the processor and can send data to and receive data from the processor by various known means.

Figure 10:
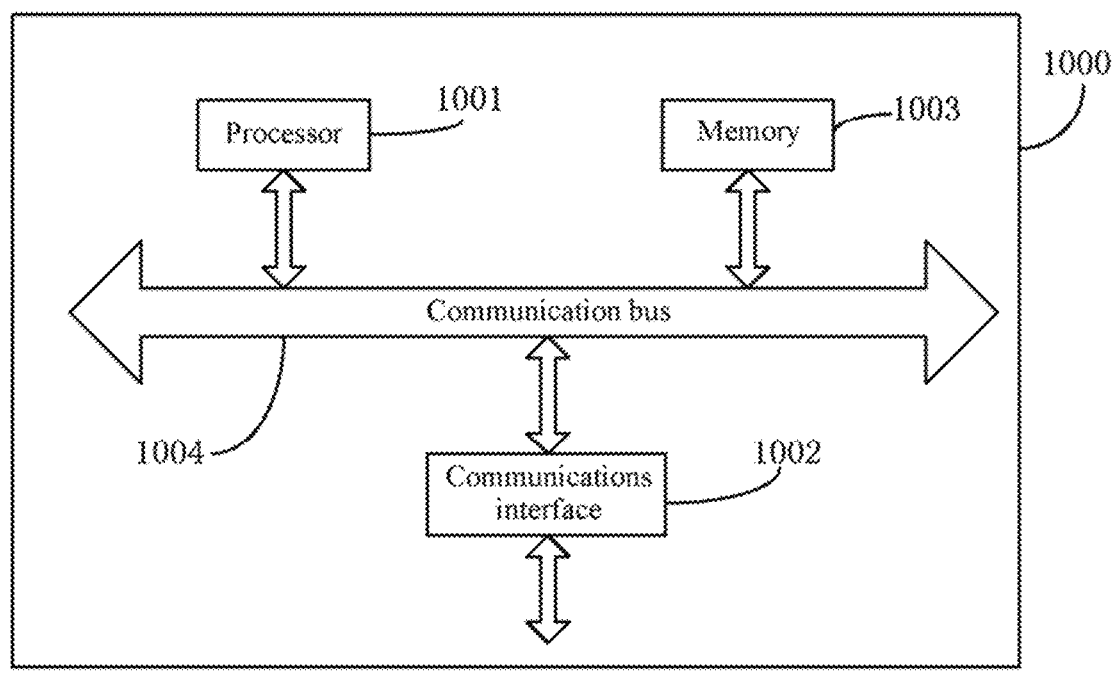
FIG. 10 is a schematic diagram of one form of an electronic device.

Additional forms of the present disclosure further provide an electronic device. As shown in FIG. 10, a device 1000 includes: a processor 1001, a communications interface 1002, a memory 1003, and a communications bus 1004. The processor 1001, the communications interface 1002, and the memory 1003 communicate with each other using the communications bus 1004. The processor 1001 can invoke a computer program that is on the memory 1003 and that is executable on the processor 1001, to perform the detection method provided by the above embodiments and implementations. For example, the method includes: obtaining a scan graphic of a to-be-detected device, where the to-be-detected device includes a patterned wafer or a mask; superimposing and comparing the layout graphic of the to-be-detected device and the scan graphic of the to-be-detected device, to extract a to-be-detected non-overlapping pattern; and encoding the to-be-detected non-overlapping pattern to form to-be-detected coded data, and inputting the to-be-detected coded data into the detection model, to output a detection result.

Yet additional forms of the present disclosure further provides a storage medium, the storage medium storing one or more computer instructions, the one or more computer instructions being used to implement the detection methods provided in some implementations of the present disclosure.

The storage medium is a computer-readable storage medium, and may be any medium that can store program code, such as a read-only memory (ROM), a random access memory (RAM), a USB flash disk, a mobile hard disk, a magnetic disk, or an optical disc.

Based on the above, according to the technical solution provided in the present disclosure, a detection model is established and trained using a machine learning algorithm, and a detection model library is formed; a defect point of a to-be-detected semiconductor device is detected using the detection model library, where a layout graphic and a scan graphic of the semiconductor device are superimposed and compared, to extract a sample non-overlapping pattern; and the sample non-overlapping pattern is encoded to form sample coded data, and the sample coded data is used as input data of the machine learning algorithm, thereby establishing and training the detection model. In a process of superimposing and comparing, all non-overlapping patterns can be extracted, and then training and detection are performed using machine learning. Therefore, defect points of a semiconductor device can be collected fully and rapidly, avoiding omission of defect points, thereby improving detection accuracy of a defect point.

Although embodiment and implementations of the present disclosure are disclosed above, the present disclosure is not limited thereto. A person skilled in the art can make various changes and modifications without departing from the spirit and the scope of the present disclosure, and therefore the protection scope of the present disclosure should be subject to the scope defined by the claims.

What is claimed is:

1. A computer-implemented detection method, comprising:
    superimposing and comparing, with a processor circuitry, a layout graphic of a sample device and a scan graphic of the sample device, and extracting, with the processor circuitry, a sample non-overlapping pattern;
    encoding, with the processor circuitry, the sample non-overlapping pattern, to form sample coded data, the sample coded data comprising a multidimension data matrix and the multidimensional data matrix comprises grayscale values of pixels of the sample non-overlapping pattern;
    training, with the processor circuitry, a machine learning model based on a convolutional neural network with the sample coded data as training data, to obtain a detection model library;
    executing, with the processor circuitry, the detection model library to input a layout graphic of a to-be-detected device and a scan graphic of the to-be-detected device to obtain a defect detection result of the to-be-detected device; and
    outputting, with the processor circuitry, the defect detection result of the to-be-detected device.

2. The detection method according to claim 1, further comprising:
    using an electron microscope to obtain the scan graphic of a sample device or the scan graphic of the to-be-detected device.

3. The detection method according to claim 1, wherein superimposing and comparing the layout graphic and the scan graphic, and extracting a sample non-overlapping pattern comprises:
    superimposing the layout graphic and the scan graphic, and performing an exclusive-or operation on the superimposed graphics.

4. The detection method according to claim 1, wherein superimposing and comparing the layout graphic and the scan graphic, and extracting a sample non-overlapping pattern further comprises:
    performing interference elimination processing on the sample non-overlapping pattern through a graphic extraction rule.

5. The detection method according to claim 4, wherein the graphic extraction rule comprises:
    setting a processing range of a long side to 9% to 11% of a design feature size, and
    setting a processing range of a short side to 35 nm to 45 nm.

6. The detection method according to claim 1, wherein the sample coded data is a multidimensional data matrix.

7. The detection method according to claim 1, wherein the sample coded data is a two-dimensional data matrix, and the sample coded data is in a format of m*n*t, wherein m*n represents a size of the matrix, and t represents a quantity of channels.

8. The detection method according to claim 7, wherein the sample non-overlapping pattern is a grayscale pattern, and t is 1.

9. The detection method according to claim 1, wherein the to-be-detected device is a mask or a patterned wafer.

10. A detection apparatus, comprising:
    an obtaining module configured to obtain a layout graphic and a scan graphic;
    an extraction module configured to superimpose and compare the layout graphic and the scan graphic, and to extract a sample non-overlapping pattern;
    an encoding module configured to encode the sample non-overlapping pattern to form a sample coded data machine learning module configured to use the sample coded data as input data of machine learning, to obtain a detection model library; and
    a detection module configured to detect a defect point of a to-be-detected device by using the detection model library.

11. The detection apparatus according to claim 10, wherein the machine learning module is a module configured to execute a machine learning algorithm based on a convolutional neural network.

12. The detection apparatus according to claim 10, wherein the to-be-detected device is a mask or a patterned wafer.

13. An electronic device, comprising:
    a memory operable to store computer-readable instructions; and
    a processor circuitry operable to read the computer-readable instructions, the processor circuitry when executing the computer-readable instructions is configured to:
    obtain a scan graphic of a to-be-detected device;

superimpose and compare a layout graphic of the to-be-detected device and the scan graphic of the to-be-detected device, to extract a to-be-detected non-overlapping pattern;

encode the to-be detected non-overlapping pattern to form to-be-detected coded data, the to-be-detected coded data comprising grayscale values of pixels of the to-be-detected non-overlapping pattern;

obtain a detection model which is a machine learning model based on a convolutional neural network trained to defect point of a device;

execute the detection model to input the to-be-detected coded data into the detection model to obtain a detection result of the to-be-detected device; and output the detection result of the to-be-detected device.

14. A non-transitory machine-readable media, having instructions stored on the machine-readable media, the instructions configured to, when executed, cause a processor to:

obtain a scan graphic of a to-be-detected device;

superimpose and compare a layout graphic of the to-be-detected device and the scan graphic of the to-be-detected device, to extract a to-be-detected non-overlapping pattern;

encode the to-be detected non-overlapping pattern to form to-be-detected coded data, the to-be-detected coded data comprising grayscale values of pixels of the to-be-detected non-overlapping pattern;

obtain a detection model which is a machine learning model based on a convolutional neural network trained to defect point of a device; and execute the detection model to input the to-be-detected coded data into the detection model to obtain a detection result of the to-be-detected device; and output the detection result of the to-be-detected device.

* * * * *